United States Patent [19]
Danielson et al.

[11] Patent Number: 6,039,303
[45] Date of Patent: Mar. 21, 2000

[54] HIGH PRESSURE FLUIDLINE CONNECTOR

[75] Inventors: Robert B. Danielson, Mahtomedi; Stanlee W. Meisinger, Golden Valley, both of Minn.

[73] Assignee: FasTest, Inc., St. Paul, Minn.

[21] Appl. No.: 08/978,256

[22] Filed: Nov. 25, 1997

[51] Int. Cl.[7] ................................................ F16L 37/28
[52] U.S. Cl. .................................. 251/149.6; 137/614.03
[58] Field of Search ............................ 251/149.6, 149.1; 137/614.03, 614, 614.05, 614.04

[56] References Cited

U.S. PATENT DOCUMENTS

| | | |
|---|---|---|
| 1,297,719 | 3/1919 | Myers . |
| 2,388,179 | 10/1945 | Prowd . |
| 3,291,442 | 12/1966 | Cranage . |
| 3,655,225 | 4/1972 | Major . |
| 3,727,952 | 4/1973 | Richardson . |
| 3,757,836 | 9/1973 | Masuda . |
| 3,825,223 | 7/1974 | Richardson . |
| 4,366,945 | 1/1983 | Blauenstein . |
| 4,776,614 | 10/1988 | Marrison et al. . |
| 4,805,417 | 2/1989 | Weaver et al. . |
| 4,884,830 | 12/1989 | Meisinger . |
| 4,889,149 | 12/1989 | Weaver et al. . |
| 5,074,332 | 12/1991 | Jones . |
| 5,095,947 | 3/1992 | Weh et al. . |
| 5,209,528 | 5/1993 | Weh et al. . |
| 5,244,010 | 9/1993 | Barjasteh et al. . |
| 5,390,963 | 2/1995 | Namekawa . |
| 5,450,875 | 9/1995 | Chichester et al. . |
| 5,560,407 | 10/1996 | Swinford . |
| 5,575,510 | 11/1996 | Weh et al. . |
| 5,613,816 | 3/1997 | Cabahug . |

FOREIGN PATENT DOCUMENTS

| | | |
|---|---|---|
| 36 08 463 A 1 | 9/1987 | Germany . |
| WO 90/14546 | 11/1990 | WIPO . |
| WO 96/22488 | 7/1996 | WIPO . |

*Primary Examiner*—Kevin Lee
*Attorney, Agent, or Firm*—Merchant & Gould P.C.

[57] ABSTRACT

A quick connect connector for connecting to a fluidline in a safe, reliable manner. The connector includes a body member having a central fluid passageway with a valve fixedly secured therein for selectively controlling fluid flow through the passageway. A piston member is slideably engaged with the body member, with the body member being slideable relative to the piston member between a first position and a second position. A collet assembly or a ball detent assembly is connected to the piston member for connecting the fluidline, which has a valve at the end thereof, to the piston member. A positioning and retaining mechanism is provided for selectively controlling movement of the body member relative to said piston member between the first position and the second position and for retaining the body member at the second position. The collet assembly or the ball detent assembly initially secures the fluidline to the piston member prior to the valves in the fluidline and the body member being opened. When the positioning and retaining mechanism actuates the body member to the second position, the valves are opened, thereby permitting flow through the connector.

32 Claims, 6 Drawing Sheets

HIGH PRESSURE FLUIDLINE CONNECTOR

FIELD OF THE INVENTION

The present invention relates to connecting or coupling devices, and in particular to a connector device to permit quick connecting to a high pressure fluidline.

BACKGROUND OF THE INVENTION

In the refrigeration industry, high pressure fluidlines, tubes, conduits and the like that are found in refrigeration apparatus are often subjected to high pressure testing and recharging operations. In such operations, it is necessary to be able to connect the fluidline to the testing or recharging equipment in a quick and easy manner. Many times, the fluidline is located in a tight space, so that little room is available in order to accomplish such a connection.

Typically, these high pressure fluidlines include a valve, such as a Schrader valve, in the end thereof which must be opened when the connection is made to permit flow between the fluidline and the connector, and then to the equipment. As disclosed in U.S. Pat. Nos. 3,727,952 and 3,825,223 to Richardson, previous connectors have been generally designed with structure to accomplish the opening of the valve in the fluidline as the connector and fluidline are connected together. In each of these connectors, a sleeve must first be pulled backward relative to a body portion. The end of the fluidline is then forced into the connector, thereby forcing a plunger member backward to expose the end of the fluidline to a gripping collet assembly. Further, as the plunger member is forced backward, a valve opening member in the connector contacts the valve in the fluidline to thereby open the valve. Once the fluidline is fully inserted, the sleeve is released to lock the fluidline within the connector. Each of these connector devices requires the use of two hands in order to permit the connection, thus making it difficult, if not impossible, to use the connectors in tight spaces or when only a single hand is available. Further, the collet assembly locks the fluidline within the connector after, or simultaneously with, opening of the valve in the fluidline, so that in certain circumstances, the fluidline could possibly become dislodged before a proper locking is achieved, resulting in the escape of fluid from the connector.

What is needed is a connector for connecting to a high pressure fluidline, that can be operated using a single hand and that locks the fluidline to the connector before fluid is allowed to flow through the connector.

SUMMARY OF THE INVENTION

The present invention provides a quick connect connector for connecting to a fluidline in a safe, reliable manner. The connector is designed to permit one-handed connection with the fluidline, such that the connector can be used in locations where space is limited. Further, the connector in accordance with the present invention ensures that the fluidline is secured in a sealed relationship with the connector before fluid is allowed to flow to or from the fluidline.

A preferred embodiment of the connector in accordance with the principles of the present invention includes a body member having a central fluid passageway with a valve fixedly secured therein for selectively controlling fluid flow through the passageway. A piston member is slideably engaged with the body member, with the body member being slideable relative to the piston member between a first position and a second position. A collet assembly or a ball detent assembly is connected to the piston member for connecting the fluidline to the piston member. Positioning and retaining means are provided for selectively controlling movement of the body member relative to said piston member between the first position and the second position and for retaining the body member at the second position.

In a more preferred embodiment of the present invention, the positioning and retaining means includes a sleeve slideably disposed on an outer surface of the body member for sliding movement between a disengaged position and an engaged position. Actuating balls are disposed within actuating holes in the body member and are engaged by an inner surface of the sleeve, and the balls engage with an actuating groove formed in the piston member. The inner surface of the sleeve includes an angled ramp section that contacts the actuating balls, such that as the sleeve is slid from the disengaged position to the engaged position, the balls are forced downward into the actuating groove, thereby moving the body member from the first position to the second position.

The connector is configured such that when the body member is moved from the first position to the second position, the valve in the body member and a valve in the fluidline are opened to permit flow through the connector. The connector is further designed such that the collet assembly, or alternatively the ball detent assembly, connects the fluidline to the piston member in a sealed manner prior to the valves being opened. Therefore, leakage of fluid from the connector is prevented since the fluidline is locked in place within the connector, and is sealed relative thereto, prior to the valves being opened.

These and various other advantages and features of novelty which characterize the invention are pointed out with particularity in the claims annexed hereto and forming a part hereof. However, for a better understanding of the invention, its advantages and objects attained by its use, reference should be made to the drawings which form a further part hereof, and to the accompanying description, in which there is described a preferred embodiment of the invention.

DETAILED DESCRIPTION OF THE PREFERRED EMBODIMENT

Figure 1:
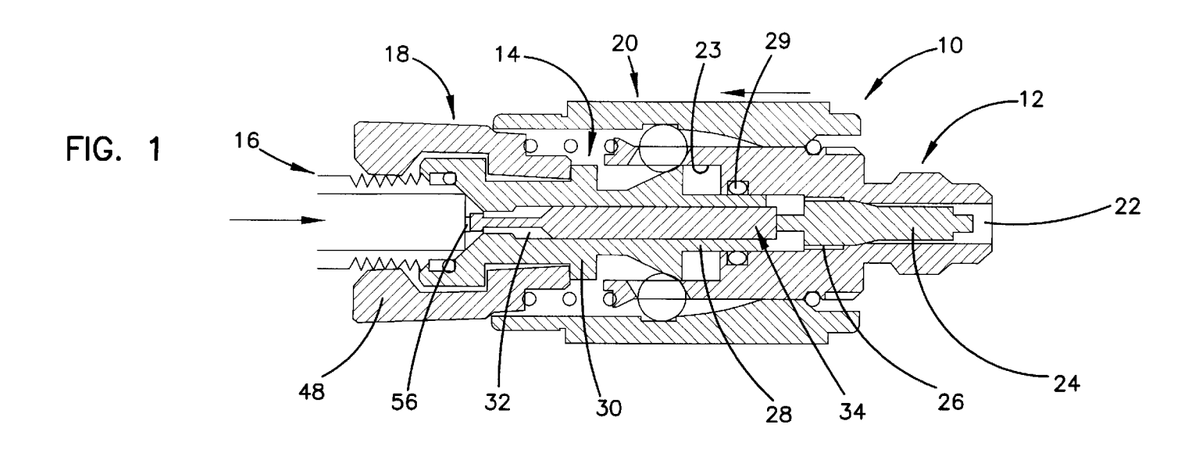
FIG. 1 is a longitudinal cross-sectional view of the connector according to the present invention, illustrating the end of the fluidline inserted into the connector, with the sleeve in the disengaged position and the collet assembly being in a non-grip configuration.
Figure 2:
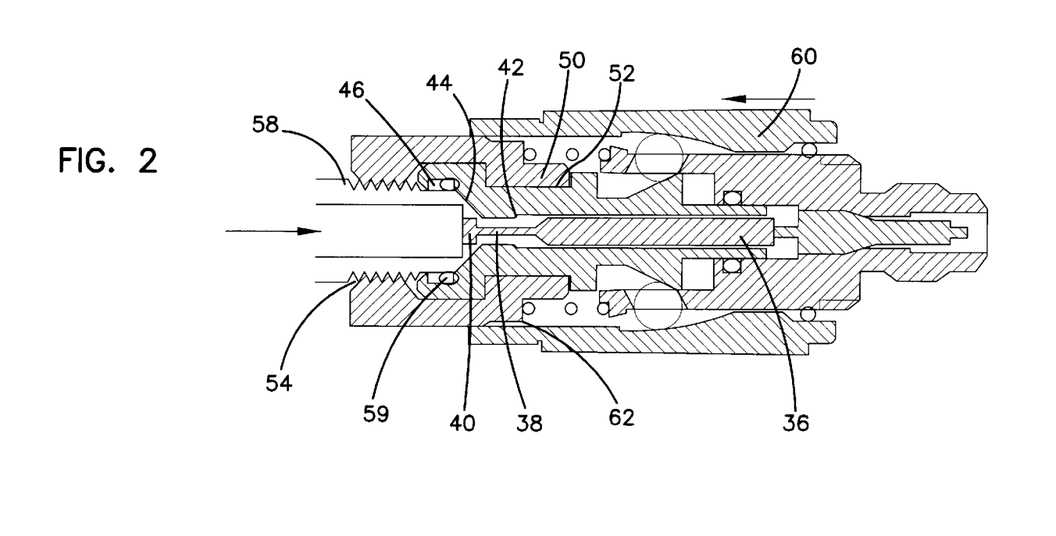
FIG. 2 is a view similar to FIG. 1, but showing the sleeve moved from the disengaged position thereby actuating the collet assembly into gripping connection with the fluidline.
Figure 3:
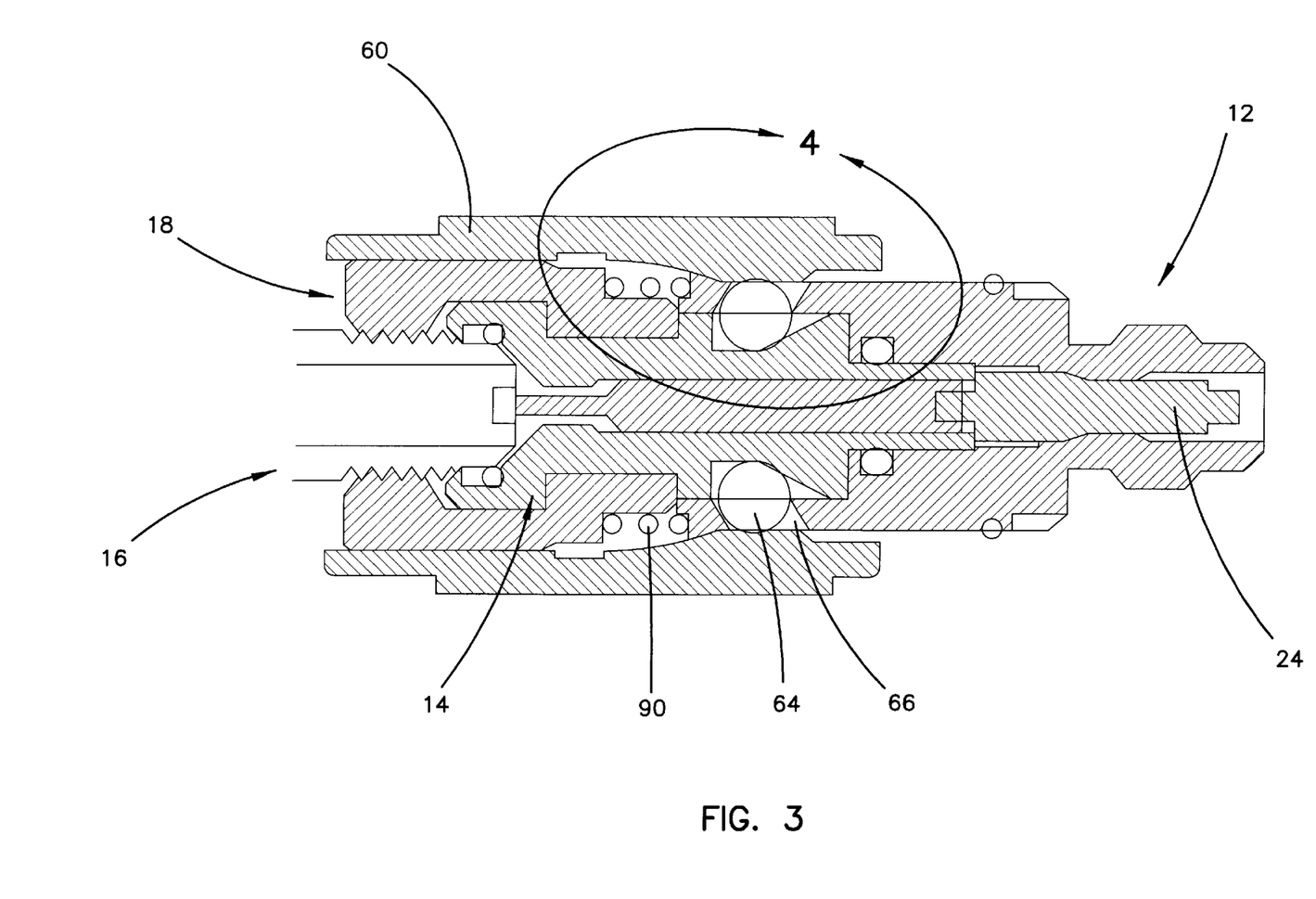
FIG. 3 is a view similar to FIG. 1, but showing the sleeve moved to the engaged position, with the body member thus being moved to the second position thereby opening the valves.

Referring now to FIGS. 1–3 a connector 10 in accordance with the principles of the present invention is illustrated. The connector 10 includes a body member 12 slideably disposed upon a piston member 14 for sliding movement relative to the piston member between a first position (shown in FIGS. 1 and 2) and a second position (shown in FIG. 3). A fluidline 16 is connected to the piston member 14 by a connecting means in the form of a collet assembly 18, such that the fluidline is locked relative to the piston member. The connector 10 further includes a positioning and retaining means 20 that actuates the collet assembly 18, as well as actuating the body member 12 from the first position to the second position and maintaining the body member in the second position.

The body member 12 is generally cylindrical in shape and includes a stepped, central bore formed therethrough extending from one end of the body member to the other end. The stepped bore includes a first, small diameter portion forming a central fluid passageway 22, and a second, large diameter portion 23 that is sized so as to slideably receive the piston member 14. A valve 24, such as a Schrader valve of conventional construction, is fixed within the passageway 22 to control fluid flow through the passageway. Although the valve 24 is described as being a Schrader valve, other types of valves can be used if desired. The valve 24 is preferably secured within the passageway 22 using interengaging threads 26 on the valve and passageway, so that the valve 24 can be removed from the passageway if desired. However, other means for fixing the valve within the passageway can be used. Since the valve is fixed within the passageway, the valve 24 moves with the body member 12 during movement between the first and second positions thereof.

The piston member 14, as set forth previously, is slideably engaged with the body member 12. Specifically, the piston member 14 is partially disposed within, and surrounded by, the body member, and includes a first cylindrical portion 28 that is slideably disposed within the the passageway 22, as well as a second cylindrical portion 30 slideably disposed within the large diameter portion 23. An o-ring seal 29 is provided to prevent fluid leakage between the outer surface of the first cylindrical portion 28 and the inner surface of the passageway 22.

A central bore 32 is formed through the piston member 14 from one end to the other end thereof and which is generally aligned with the passageway 22, and a valve actuating member 34 is slideably disposed within the bore 32. The actuating member 34 is generally rectangular in shape, or equivalently has flattened sides, so that fluid can flow past the actuating member 34 and through the bore 32. The actuating member 34 includes a large body portion 36 which engages with the first valve 24, and a neck portion 38 with an enlarged head 40. The bore 32 is preferably stepped so as to define a shoulder 42 which limits forward movement of the large body portion 36 within the bore 32. One end of the bore 32 is enlarged to thereby define a conical bore portion 44 and a large cylindrical bore portion 46.

The collet assembly 18 includes a plurality, preferably four, circumferentially arranged collet segments 48 (only two segments being shown in the figures). Each collet segment 48 includes a first portion 50 that is disposed within a circumferential slot 52 formed in the outer surface of the second cylindrical portion 30 of the piston member 14. The opposite end of each collet segment 48 includes an inner surface having threads 54 formed thereon. The collet segments 48 are slightly pivotable relative to the piston member 14 from a non-gripping position, shown in FIG. 1, to a gripping position, shown in FIG. 2. The non-gripping position of the collet segments facilitate insertion of the end of the fluidline 16 into the connector 10, with the gripping position securely connecting the fluidline to the piston member and the connector.

The fluidline 16 is generally conventional in construction and includes a valve 56, such as a Schrader valve, in the end thereof to control flow through the fluidline 16. Threads 58 are formed on the exterior surface of the end of the fluidline 16 for mating contact with the threads 54 on the inner surface of the collet segments, to thereby securely connect the collet segments and the fluidline in the gripping position of the collet segments 48. The end of the fluidline is beveled for mating contact with the conical bore portion 44, thereby defining the fully inserted position of the fluidline. An o-ring seal 59 is disposed within a recess in the large cylindrical bore portion 46 which seals with the outer surface of the fluidline when the fluidline is inserted, to prevent fluid leakage from the bore 32. Although only a single o-ring seal 59 is illustrated in FIGS. 1–3, it is of course possible to use multiple o-ring seals to provide proper sealing between the fluidline and the piston member.

As shown in FIG. 1, when the fluidline 16 is fully inserted, the beveled end of the fluidline engages the conical bore portion 44 to prevent further insertion of the fluidline, with the o-ring seal 59 sealing the fluidline relative to the piston member. When the collet segments 48 are actuated to the gripping position, the threads 54 on the collet segments engage the threads 58 on the exterior surface of the fluidline 16, thereby ensuring a secure connection between the piston member and the fluidline. Further, in the fully inserted position of the fluidline, the valve 56 thereof is disposed adjacent to the head 40 of the actuating member 34. Thus, as the body member 12 is moved from the first position shown in FIG. 1 toward the position shown the FIG. 3, the valve 24 moves the valve actuating member 34 forward within the bore 32 until the head 40 engages the valve 56. Once the valve actuating member 34 contacts both valves 24, 56, further movement of the body member 12 to the second position causes the valve actuating member to open both valves, thus permitting fluid flow from the fluidline 16, through the bore 32 past the valve actuating member 34, and through the fluid passageway 22 via the valve 24. It should be realized that the fluid can flow in the opposite direction to that described above, such as when the fluidline is to be charged, namely through the passageway 22 via the valve 24, past the actuating member 34, and into the fluidline 16 via the valve 56.

Actuation of the collet assembly 18 to the gripping position, and actuation of the body member 12 to the second position, is accomplished by the positioning and retaining means 20. The positioning and retaining means 20 includes a generally cylindrical sleeve 60 slideably disposed on the outer surface of the body member 12 for longitudinal sliding movement between a disengaged position (shown in FIG. 1) and an engaged position (shown in FIG. 3). The forward end of the sleeve 60 is slideably disposed on the outer surfaces of the collet segments 48, with the end of the sleeve 60 disposed in a slightly reduced diameter section 62 of each collet segment 48 in the disengaged position thereof. As evident from FIG. 2, this permits the collet segments 48 to pivot slightly relative to the piston member 14 to the non-gripping position to facilitate insertion of the fluidline.

As the sleeve 60 is slid forward from the disengaged position, the end of the sleeve 60 ramps upward out of the reduced diameter sections 62, thereby forcing the collet segments inward toward the gripping position, as shown in FIG. 2. Thus, as is clear from FIG. 2, in the gripping position, the collet segments 48 are clamped around the end of the fluidline, thereby securely connecting the fluidline 16 to the piston member 14. However, in this position the body member 12 has not been actuated forward sufficiently to open the valves 24, 56, so that the fluidline is securely connected to the piston member prior to the valves being opened.

A plurality of circumferentially spaced actuating balls 64 are moveably disposed within respective apertures 66 formed in the body portion 12, and a circumferential actuating groove 68 is formed in the outer circumference of the cylindrical portion 30 of the piston member 14, with the bottom portion of the balls 64 engaging with the groove 68. The inner surface of the sleeve 60 engages with the balls 64 to thereby force the balls downward into the groove 68 as the sleeve is slid forward from the disengaged position to the engaged position.

Figure 4:
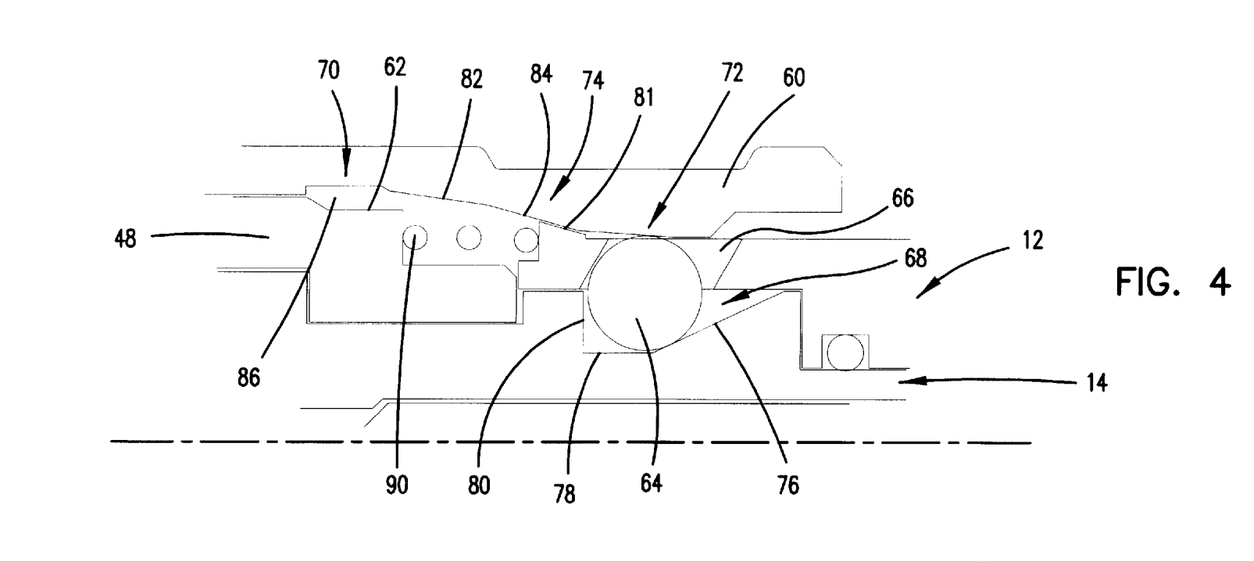
FIG. 4 is a detailed view of the portion contained within the circle 4—4 in FIG. 3.

With reference to FIG. 4, the inner surface of the sleeve 60 includes a first section 70, a second section 72, and an angled ramp section 74 between the sections 70, 72. The first section 70 is located so as to engage the balls 64 when the sleeve 60 is in the disengaged position, as can be seen in FIG. 1, while the second section 72 is located so as to engage the balls 64 when the sleeve 60 is in the engaged position, as shown in FIGS. 3 and 4. The angled ramp section 74 is angled so as to force the balls downward into the holes 66 as the sleeve is slid forward on the body member toward the engaged position. The groove 68 is defined by a relatively steeply angled wall portion 76 upon which the balls 64 engage, a flat bottom wall portion 78, and a radial or vertical wall portion 80. However, the portions 78 and 80 can have other shapes if desired.

As shown in FIG. 1, when the sleeve 60 is at the disengaged position, the first section 70 of the sleeve is disposed over the actuating balls 64, and the balls are disposed at the top of the angled wall portion 76. As the sleeve 60 is slid forward toward the engaged position, the angled ramp section 74 forces the balls downward. Typically, the fluidline 16, and therefore the piston member 14 connected thereto, are fixed or stationary, so that the piston member 14 cannot move. Since the piston member 14 is fixed, forcing the balls 64 downward creates a force on the holes 66 of the body member 12, thereby forcing the body member 12 forward on the piston member 14 toward the second position. As the body member 12 moves forward, the position of the actuating balls 64 within the groove 68 changes, with the balls moving down the angled wall portion 76 and also moving radially inward within the holes 66. The forward end of the body member 12 includes an angled shoulder 81 which is angled for mating contact with the angled ramp section 74 when the body member is in the second position and the sleeve 60 is at the engaged position, thereby defining a forward stop for the sleeve 60, as shown in FIG. 4.

Preferably, for high pressure applications, the angled ramp section 74 includes a short, first angled transition portion 82 adjacent the first section 70 and a long, second angled actuating portion 84 extending from the first portion 82 and extending to the second section 72. The angle of the first portion 82 is relatively shallow compared with the relatively large angle of the second portion 84 to provide a smooth transition of the balls 64 from the first section 70 to the angled portion 84 as the sleeve 60 is slid forward, thereby preventing hang-ups or locking of the sleeve which might occur if the balls transitioned directly from the first section 70 to the relatively large angle of the second portion 84. However, the angle of the angled wall portion 76 of the groove 68 is relatively steep or large compared with the angle of the second portion 84, thereby providing a mechanical advantage as the sleeve 60 is slid toward the engaged position. This mechanical advantage allows for connection under high pressure. Therefore, the ratio of the angle of the wall portion 76 to the angle of the second portion 84 is at least greater than one, with the ratio being maximized to provide the desired mechanical advantage. As is evident from FIG. 2, when the sleeve 60 is slid forward to actuate the collet segments 48 to the gripping position, the first portion 82 will be disposed over the balls 64 so that the balls are only forced downward slightly, and little forward movement of the body member 12 occurs. For lower pressure applications, the portion 82 can be made horizontal instead of angled so that the angled ramp section 74 is formed solely by the actuating portion 84, as is illustrated in FIGS. 6–11.

The first section 70 is defined by a circumferential detent groove 86 that receives the balls 64 therein when the sleeve 60 is in the disengaged position. The detent groove 86 keeps the sleeve 60 from moving forward and locking the collet segments 48 onto the fluidline 16 prematurely. The detent groove 86 overcomes the friction caused by the collet segments 48 slipping over the teeth 58 on the end of the fluidline 16 by resisting the movement of the balls 64 until the end of the fluidline contacts the conical bore portion 44 and enough pressure is exerted on the piston member 14. The groove 86, however, is optional so that the first section 70 can be instead horizontally flat, as is shown in FIGS. 6–11.

To enable the connector 10 to be removed under pressure, the second section 72 of the inner surface of the sleeve 60 is formed with a slight angle, as is best seen in FIG. 4. This slight angle of the second section 72 makes it easier for the sleeve 60 to start moving toward the disengaged position. To further aid in removing the connector 10 under pressure, the holes 66 are angled. By angling the holes 66 in this manner, the radial loading on the balls 64 that is generated when the connector 10 is under pressure is partially taken up by the body member 12, thereby reducing the frictional forces on the inner surface of the sleeve 60 that the balls 64 produce. However it should be realized that the frictional force of the balls on the second section 72 is sufficient to prevent casual or unintended movement of the sleeve to the disengaged position, so that the sleeve is maintained in the engaged position until disconnection is desired.

Figure 5:
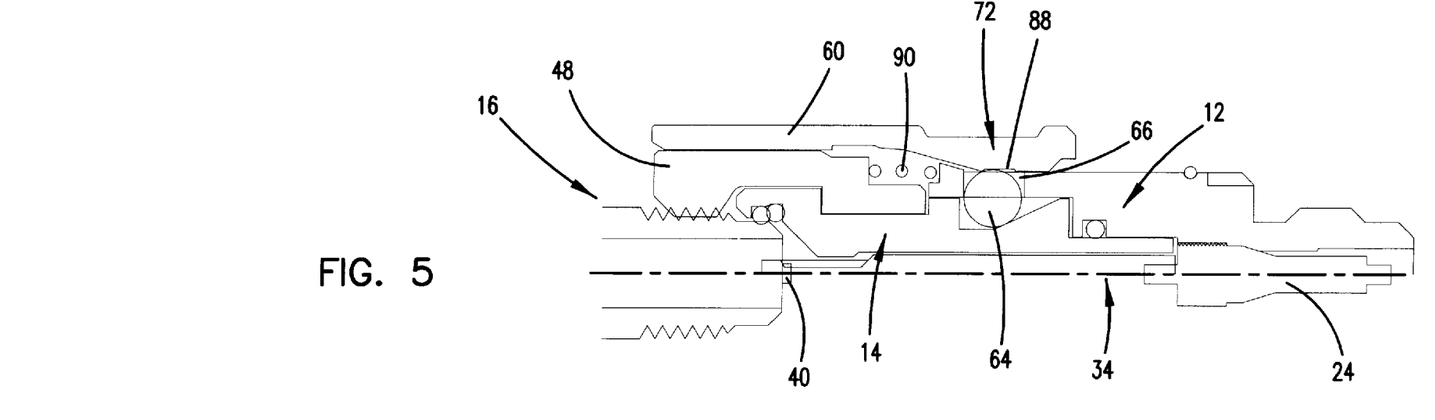
FIG. 5 is a partial sectional view showing an alternate embodiment of the connector.

Alternatively, as illustrated in FIG. 5, when the connector 10 is not to be disconnected under pressure, the second section 72 is not angled, but instead includes a circumferential detent groove 88 which receives the balls 64 therein at the engaged position of the sleeve 60. When the connector 10 is under pressure, the balls 64 will be radially loaded, thereby forcing them into the detent groove 88. The engagement between the radially loaded balls and the detent groove 88 prevents rearward movement of the sleeve to the disengaged position, until the pressure is removed from the connector 10. Further, since the connector 10 is not intended to be disconnected under pressure, the holes 66 are made to be radial, thereby eliminating the angle, since the radial loading of the balls does not have to be taken up by the body member 12.

In each of the embodiments of FIGS. 1–4 and 5, a coil spring 90 is disposed between the collet segments 48 and the forward end of the body member 12 to bias the body member away from the collet segments and toward the first position thereof. Therefore, when the connector 10 is disconnected by moving the sleeve 60 to the disengaged position, the spring 90 forces the body member 12 to the first position, shown in FIG. 1, to permit the fluidline 16 to be disconnected.

Operation of the connector 10 is as follows. When the connector 10 is to be connected to the fluidline 16, the sleeve 60 is slid to the disengaged position and the connector is moved so that the collet segments 48 are slid over the end of the fixed fluidline. As soon as the end of the fluidline contacts the conical bore portion 44, the force of the balls 64 within the detent groove 86 is overcome, and the sleeve 60 can start moving toward the engaged position. As shown in FIG. 2, the initial forward movement of the sleeve 60 causes the sleeve to ramp up out of the reduced diameter sections 62 of the collet segments 48, thereby forcing the collet segments into clamping engagement with the end of the fluidline, so that the fluidline is connected to the piston member 14. During this initial movement of the sleeve, the body member 12 is moved very slightly toward the second position by the balls 64 engaging with the first, small angled portion 82 of the inner surface of the sleeve. Since the valve 24 is fixed to the body member 12, it moves therewith and pushes the valve actuating member 34 into engagement with the valve 56 in the fluidline. However, the valve 24, valve actuating member 34, and valve 56 are all configured and arranged such that the valves are not opened during this initial movement of the body member 12. Therefore, the fluidline 16 is initially connected to the connector prior to the valves being opened and permitting flow through the connector, so that the chance of fluid escaping is minimized. Further movement of the sleeve to the engaged position forces the balls 64 downward, thereby forcing the body member to the second position as explained above, and causing the valves to be opened. Once the sleeve is in the engaged position, the connection is maintained until the sleeve is moved to the disengaged position by either overcoming the friction force of the balls on the angled second section 72 of the sleeve (when disconnected under pressure), or by overcoming the force of the balls within the detent groove 88 (when disconnected without pressure in the connector).

Figure 6:
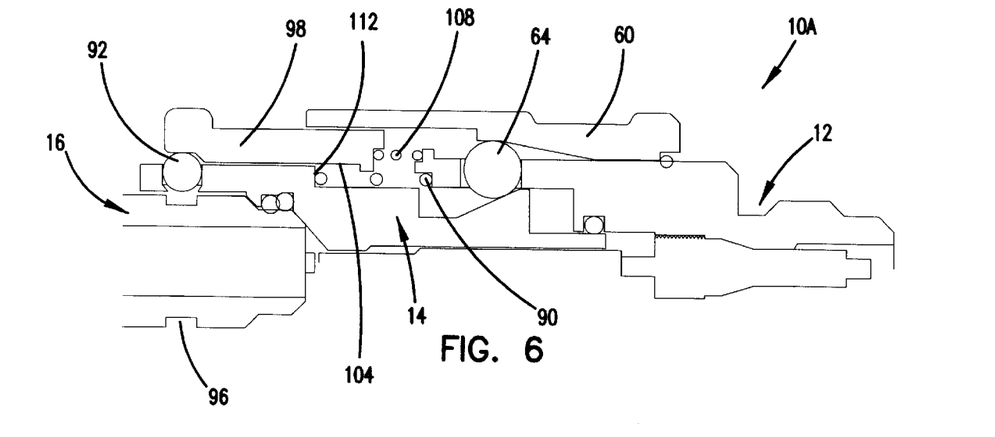
FIG. 6 is longitudinal, partial cross-sectional view similar to FIG. 1, but showing another embodiment of the connector, with the fluidline not connected to the piston member and the sleeve in the disengaged position.
Figure 7:
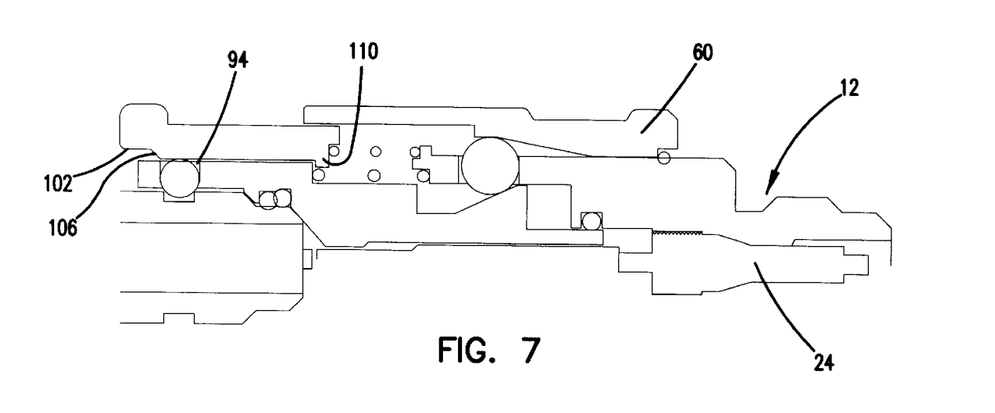
FIG. 7 is a view similar to FIG. 6, showing the fluidline connected to the piston member and with the sleeve in the disengaged position.
Figure 8:
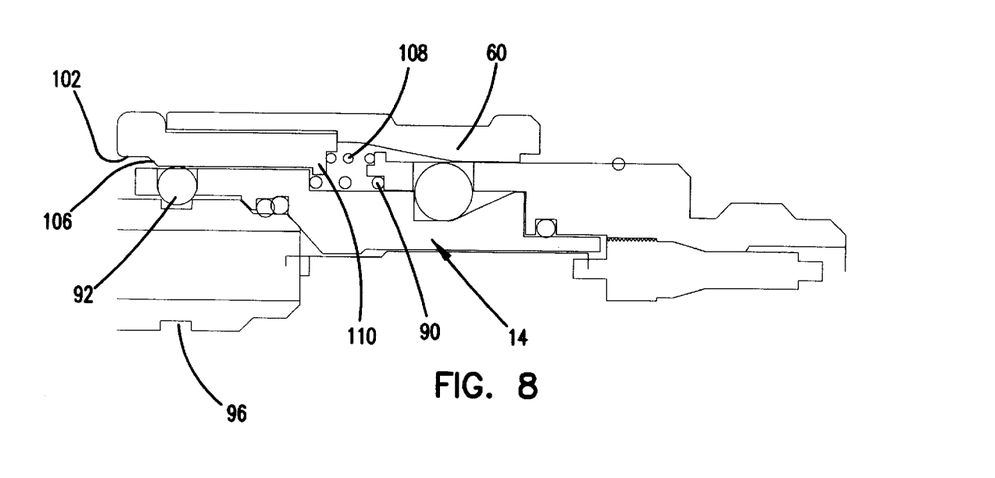
FIG. 8 is a view similar to FIG. 6, but showing the sleeve moved to the engaged position and the body member moved to the second position, thereby opening the valves.

With reference now to FIGS. 6–8, an alternate connector 10A is illustrated. The connector 10A is similar to the connector 10, with the same reference numerals being used to indicate corresponding elements. The connector 10A differs from the connector 10 in the connecting means used to connect the fluidline 16 to the piston member 14. Instead of a collet assembly 18, the fluidline is connected to the piston member 14 by a plurality of circumferentially spaced connecting balls 92 disposed for radial movement within corresponding connecting holes 94 formed in a forward extension of the piston member. The fluidline 16 is formed with a circumferential groove 96 in the outer surface thereof into which the balls 92 can extend to thereby lock the fluidline to the piston member. The portion of the fluidline between the groove 96 and the end thereof is illustrated as being smooth, however the fluidline can include threads, similar to the threads 58, if desired.

A cylindrical sleeve 98 is slideably disposed between the sleeve 60 and the piston member 14 for movement between an unconnected position (shown in FIG. 6) in which the balls 92 are allowed to move radially, and a connected position (shown in FIG. 7) in which the balls 92 are forced by the sleeve 98 down in the holes 94 and into the groove 96 to thereby lock the fluidline in place. The inner surface of the forward end of the sleeve 98 includes a first portion 102 having a first diameter and a second portion 104 having a second diameter smaller than the diameter of the first portion 102, with a ramp portion 106 separating the first portion 102 and the second portion 104. A coil spring 108 is disposed between the rear end of the sleeve 98 and the forward end of the body member 12 so as to bias the sleeve 98 and the body member away from each other. The rear end of the sleeve 98 further includes an inwardly extending flange 110 which abuts against a flange 112 defined on the piston member 14 when the sleeve 98 is moved to the connected position, to thereby stop the sleeve from further forward movement.

In order to connect to the fluidline, the sleeve 60 is moved to the disengaged position, and the sleeve 98 is then moved to the unconnected position against the bias of the spring 108, as shown in FIG. 6. In this position, the first portion 102 is disposed over the balls 92, thereby permitting the balls to move radially outward within the holes 94. The piston member 14 is then fitted over the end of the fluidline, while maintaining the sleeve 98 in the unconnected position. Once the fluidline is fully inserted (i.e. when the groove 96 is aligned with the holes 94), the sleeve 98 is released, with the spring 108 then biasing the sleeve toward the connected position. Further movement of the sleeve 98 to the connected position secures the fluidline in place. As the sleeve 98 is moved to the connected position, the ramp portion 106 forces the balls 92 downward in the holes 94 and into the groove 96, with the reduced diameter portion 104 of the sleeve 98 thereafter maintaining the balls 92 in position within the groove 96. Once the sleeve is in the connected position, as shown in FIG. 7, the fluidline is connected to the piston member 14 and the valves are unopened. Thereafter, the sleeve 60 is moved to the engaged position, shown in FIG. 8, to thereby actuate the body member 12, in the manner described above with respect to the connector 10, to the second position which causes the valves to open and permit flow to commence.

It should of course be realized that the connector 10A can be configured to permit it to be disconnected under pressure, i.e. the inner surface of the sleeve 60 can include an angled section 72 and the actuating holes 66 can be angled instead of radial.

Figure 9:
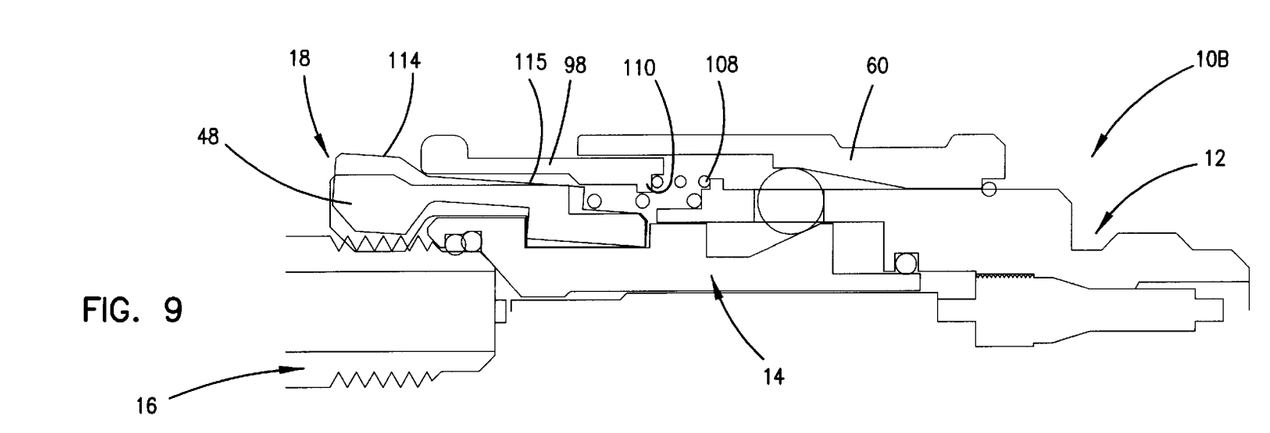
FIG. 9 is a view similar to FIG. 6, but showing another embodiment of the connector.

FIG. 9 illustrates a connector 10B that utilizes a combination of the sleeve 98 and the collet assembly 18. The collet assembly 18 is generally similar to the one used in the connector 10, including a plurality of collet segments 48 (only one being shown in FIG. 9). The collet assembly further includes a raised portion 114 and a reduced diameter section 115, which operates in a similar manner to the reduced diameter section 62 in the connector 10. The sleeve 98 is slideably disposed between the collet assembly and the sleeve 60. In the unconnected position of the sleeve 98, as shown in FIG. 9, the forward end of the sleeve 98 is disposed behind the raised portion 114, on the reduced diameter section 115, thus permitting the collet segments 48 to pivot on the piston member and permit insertion of the fluidline 16. As the sleeve 98 is slid forward toward the connected position, the forward end of the sleeve ramps up on the raised portion 114, thus forcing the collet segments into clamping engagement with the fluidline. Forward movement of the sleeve 98 occurs until the flange 110 contacts the rear end of the collet segments. The sleeve 60 is then slid to the engaged position as before to complete the connection and open the valves.

Figure 10:
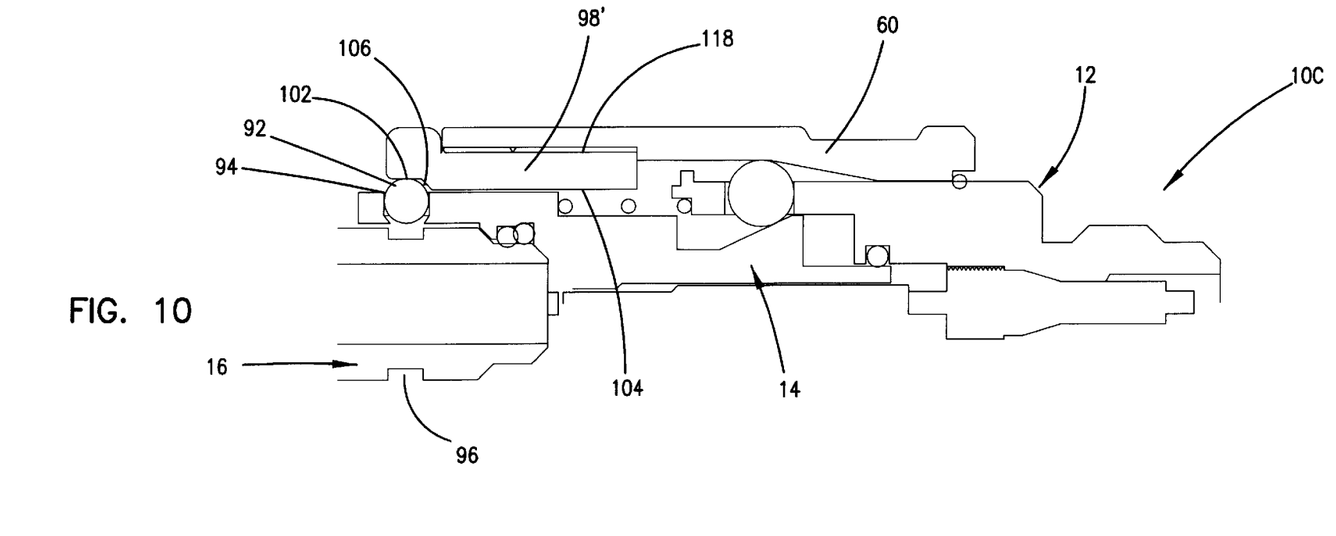
FIG. 10 is a longitudinal, partial cross-sectional view of yet another embodiment of the connector.

A connector 10C similar to the connector 10A of FIGS. 6–8 is illustrated in FIG. 10. In this connector 10C, the sleeve 98' is similar to the sleeve 98, except that the sleeve 98' is fixed to the sleeve 60 by threads 118 such that the sleeve 98' forms an integral part of the sleeve 60 and moves therewith. Thus, the movement of the sleeve 60 causes the connecting balls 92 to be forced radially inward into engagement within the groove 96. The threads 118 between the sleeve 98' and the sleeve 60 allows the sleeve 98' to be connected to, and removed from, the sleeve 60 which is necessary in order to permit assembly and disassembly of the connector 10C.

Figure 11:
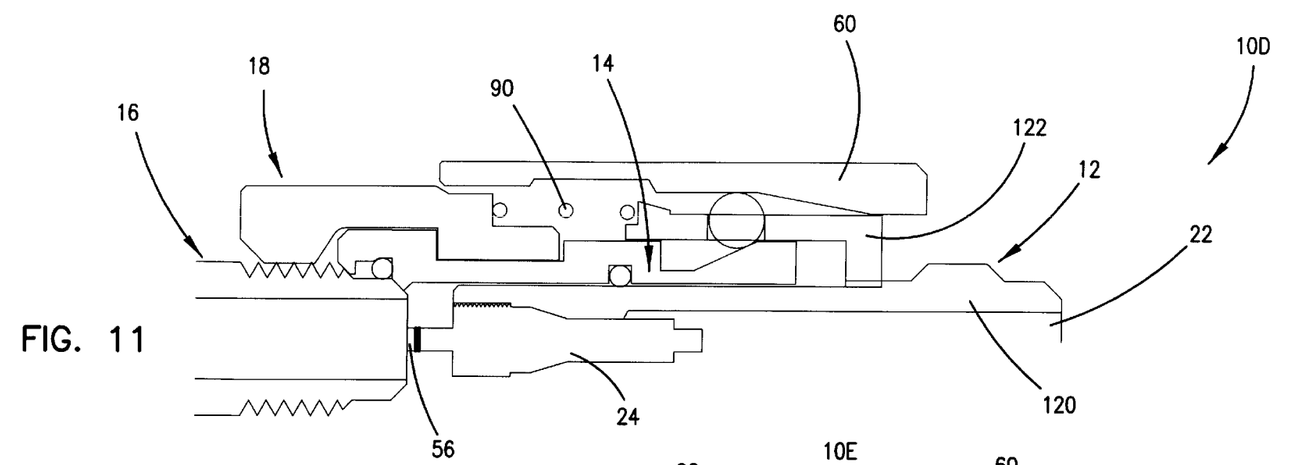
FIG. 11 is a longitudinal, partial cross-sectional view of yet another embodiment of the connector, with the valves being arranged to directly contact each other to thereby open the valves.

FIG. 11 illustrates yet another connector 10D, which is similar to the connector 10, however the valve actuator member 34 is eliminated and the valves 24, 56 are instead arranged for direct contact with each other to cause opening of the valves when they engage with each other. The body member 12 is formed in two pieces, including an elongated cylindrical central portion 120 defining the central fluid passageway 22, and a sleeve portion 122 detachably connected to the outside surface of the central portion 120, such as by threads (not shown). The piston member 14 is slideably disposed within the pocket defined between the sleeve portion 122 and the central portion 120. By providing the extended central portion 120 and disposing the piston member around the central portion, the valve 24 can be mounted within the forward end of the central portion, adjacent to the valve 56 in the fluidline 16 when the fluidline is inserted. Movement of the sleeve 60 to the engaged position causes the collet assembly to clamp around the fluidline and thereby connect it to the piston member, as well as causing movement of the body member 12 to the second position as in the previous embodiments. Since the valves 24, 56 are disposed adjacent each other, movement of the body member 12 causes the valve 24 to be moved into engagement with the valve 56, with the valves eventually being opened due to the mutual engagement therebetween as the body member moves further towards the second position thereof.

Figure 12:
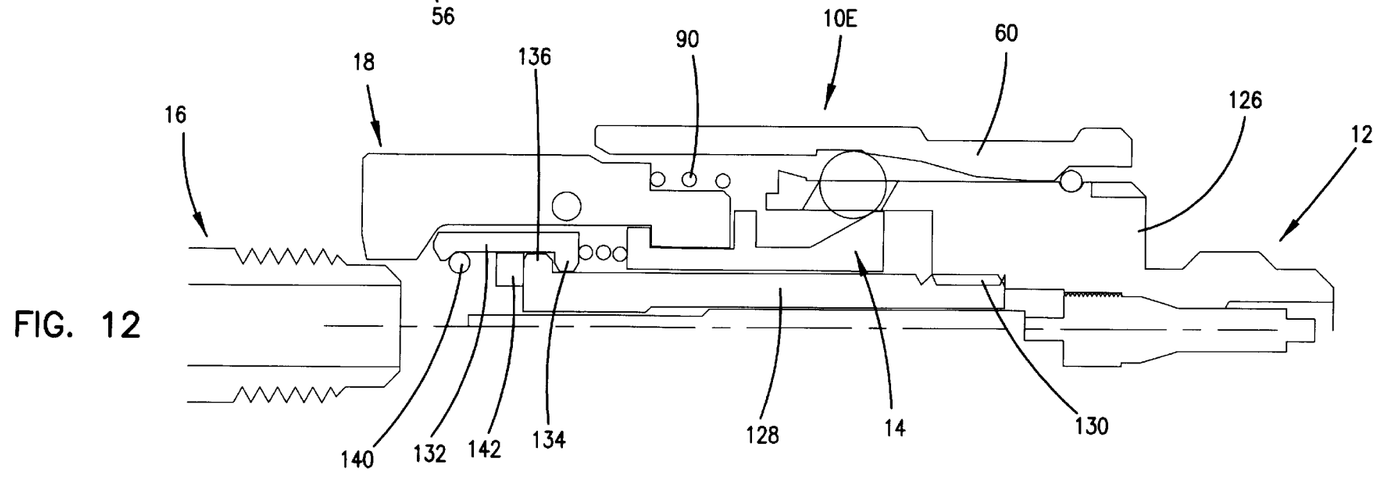
FIG. 12 is a longitudinal, partial cross-sectional view of yet another embodiment of the connector.

In the connector 10E illustrated in FIG. 12, the body member 12 is of two-piece construction, including a main body portion 126 and a forward, cylindrical extension 128 connected to the main body portion by interengaging threads 130. The piston member 14 is disposed on the outside circumference of the forward extension 128, such that the bore of the piston member is coaxial with the central fluid passageway 22. Further, the forward extension 128 and the piston member 14 are configured such that the fluidline 16 is sealed to the front end of the forward extension.

A cylindrical seal sleeve 132 is disposed around the front end of the forward extension 128 and is surrounded by the collet assembly 18. In order to permit the seal sleeve 132 to be disposed around the end of the forward extension 128, the end of the seal sleeve includes an inwardly facing thread 134 and the front end of the forward extension 128 includes an outwardly facing thread 136. The threads 134, 136 permit the sleeve 132 to be rotated onto and around the end of the forward extension 128 to the position shown in FIG. 12 where the threads are no longer engaged so that the sleeve can slide relative to the forward extension. However, once in this position, the sleeve cannot be axially pulled from the forward extension due to the engagement between the threads 134, 136 which prevent further forward axial movement of the sleeve. The threads thus act as a stop to retain the sleeve on the end of the forward extension, however the threads permit the sleeve to be removed by rotating it off the end of the forward extension.

An o-ring seal 140 and a cut seal 142 are disposed on the inner circumference of the sleeve 132 at the front and rear ends thereof, respectively. The o-ring seal 140 engages the front end of the fluidline 16 when it is fully inserted and gripped by the collet assembly 18. The cut seal 142, which is preferably rectangular in cross-section, is slideably disposed on the sleeve and engages the front end of the extension 128 at the disengaged position. As the sleeve 60 is slid to the engaged position, thereby actuating the body member 12 forward, the cut seal is pushed by the body member into engagement with the seal 140 and the end of the fluidline, to provide an improved seal. If desired, the cut seal 142 can be replaced by an o-ring seal, or a cut seal can be used in place of the o-ring seal 140. Further, additional o-ring or cut seals, or the like, can be placed between the seals 140, 142 to further enhance the sealing effect, as long as forward movement of the body member 12 to the second position is permitted.

The connector 10E includes the valve 24 disposed within the passageway 22, however the fluidline 16 is unvalved. The valve 24 can be actuated in any suitable fashion, such as by utilizing the valve actuating member 34 which would be designed so as to contact the end of the fluidline as the body member is moved to the second position and thereby cause the valve 24 to open. The connector 10E could also be used without the valve 24, such that fluid can flow freely between the fluidline and passageway 22. Further, the connector 10E can be designed so that ball and groove connecting arrangement is used in place of the collet assembly 18, in order to connect the fluidline to the body member.

As described above, the valves 24, 56 used in each embodiment are preferably Schrader-type valves, such valves being conventional in the art. However, other types of valves which operate similar to Schrader valves can be used if desired. Further, it is not necessary that the fluidline 16 include the valve 56; the fluidline 16 could instead be unvalved. In this instance, the valve actuating member 34 would be designed so as to contact the end of the fluidline 16 when the body member is moved to the second position thereof, thereby opening the valve 24. Further, when the fluidline does not include a valve and when no valve actuating member is used, such as in the embodiment of FIG. 11, the valve 24 could be configured to contact the end of the fluidline to thereby ensure opening of the valve 24. Each connector could also be used without the valve 24 therein. In this instance, the fluidline could either be valved or unvalved, with a suitable means being provided to open the valve if the fluidline is valved.

Further, while the connecting means has been described as either a collet assembly with threads or a connecting ball and groove arrangement, numerous other connecting means can be used to connect the fluidline to the piston member. For instance, the fluidline could be formed with a circumferential bead and the collet assembly could be formed with a groove that receives the bead therein, and vice versa. The fluidline and piston member could also be connected using a simple friction connection between the fluidline and the collet assembly.

It is to be understood that while certain embodiments of the present invention have been illustrated and described, the invention is not limited to the specific forms or arrangements of the parts described and shown.

We claim:

1. A fluidline connector, comprising:
   a body member having a central fluid passageway with a first valve secured therein, said first valve selectively controlling fluid flow through the passageway;
   a piston member slideably engaged with the body member, said body member being slideable relative to said piston member between a first position and a second position, and said first valve preventing flow through the passageway at said first position of the body member and said first valve permitting flow through said passageway at said second position of the body member;
   means for connecting a fluidline to the piston member; and
   positioning and retaining means for selectively controlling movement of the body member relative to said piston member between the first position and the second position and for retaining the body member at the second position, said positioning and retaining means being in engagement with the body member and the piston member.

2. The fluidline connector according to claim 1, wherein said positioning and retaining means comprises a first sleeve slideably disposed on an outer surface of said body member and moveable between a disengaged position and an engaged position, and a plurality of actuating balls; said first sleeve including an inner surface that engages the actuating balls, and said actuating balls being operatively engaged with said body member and said piston member whereby said body member is moved from the first position to the second position as said first sleeve is slid from the disengaged position to the engaged position.

3. The fluidline connector according to claim 2, wherein said body member includes actuating holes therethrough, said actuating balls being disposed within said actuating holes; and said piston member includes a circumferential actuating groove therein that receives the actuating balls.

4. The fluidline connector according to claim 3, wherein a central axis of each said actuating hole is angled relative to an axis that is perpendicular to the central fluid passageway.

5. The fluidline connector according to claim 3, wherein the inner surface of said first sleeve includes a first section that engages with the actuating balls at said disengaged position, a second section that engages with the actuating balls at said engaged position, and an angled ramp section intermediate the first and second sections that is engageable with the actuating balls as said first sleeve moves from the disengaged position to the engaged position, said angled ramp section being angled so as to force the actuating balls radially downward into the actuating holes and into the circumferential actuating groove as the first sleeve moves from the disengaged position to the engaged position.

6. The fluidline connector according to claim 5, wherein said first section includes a circumferential detent groove that receives the actuating balls therein to resist movement of the first sleeve toward the engaged position.

7. The fluidline connector according to claim 5, wherein the second section is angled relative to a central axis of the central fluid passageway.

8. The fluidline connector according to claim 5, wherein the second section includes a circumferential detent groove, said actuating balls being receivable within said detent groove at the engaged position of the first sleeve to resist movement of the first sleeve toward the disengaged position.

9. The fluidline connector according to claim 5, wherein the angled ramp section includes a first angled ramp portion and a second angled ramp portion, the angle of said first angled ramp portion being greater than the angle of said second angled ramp portion.

10. The fluidline connector according to claim 9, wherein said circumferential actuating groove includes an angled wall portion upon which the actuating balls are engaged.

11. The fluidline connector according to claim 10, wherein the angle of said angled wall portion is greater than the angle of said first angled ramp portion.

12. The fluidline connector according to claim 2, wherein said connecting means comprises a collet assembly connected to said piston member and engageable by said first sleeve, said collet assembly being actuatable by said first sleeve from a non-grip configuration at said disengaged position of said first sleeve to a gripping configuration at said engaged position of said sleeve.

13. The fluidline connector according to claim 12, wherein said collet assembly comprises a plurality of circumferentially arranged collet segments.

14. The fluidline connector according to claim 12, wherein said positioning and retaining means further comprises a bias spring engaged with the collet assembly and the body member, said bias spring biasing the body member toward the first position thereof.

15. The fluidline connector according to claim 2, wherein the connecting means comprises a collet assembly connected to said piston member, and a second sleeve engaged with the collet assembly and the first sleeve and disposed therebetween; said second sleeve being slideable relative to the collet assembly and the first sleeve between a non-grip position and a gripping position; and said collet assembly being actuatable by said second sleeve from a non-grip configuration at said non-grip position of said second sleeve to a gripping configuration at said gripping position of said second sleeve.

16. The fluidline connector according to claim 15, further comprising a bias spring engaged with the second sleeve and the body member, said bias spring biasing the second sleeve and the body member away from each other.

17. The fluidline connector according to claim 12, wherein the piston member includes a bore extending centrally therethrough, the fluidline being receivable within said bore, and further including a seal disposed in the bore for sealing the fluidline and the piston member.

18. The fluidline connector according to claim 17, wherein the collet assembly includes an interior surface, said interior surface being configured for mating contact with an exterior surface of the fluidline.

19. The fluidline connector according to claim 18, wherein said interior surface includes threads which mate with corresponding threads on the exterior surface of the fluidline.

20. The fluidline connector according to claim 2, wherein said connecting means comprises a plurality of connecting balls disposed within a corresponding plurality of connecting holes in an end of the piston member, said connecting balls being radially moveable within the connecting holes and being engageable with the fluidline.

21. The fluidline connector according to claim 20, further comprising a second sleeve engaged with the piston member and the first sleeve and disposed therebetween, said second sleeve being engageable with the connecting balls, and said second sleeve being slideable relative to the piston member and the first sleeve between an unconnected position and a connected position.

22. The fluidline connector according to claim 21, further comprising a bias spring engaged with the second sleeve and the body member.

23. The fluidline connector according to claim 21, wherein the second sleeve includes an inner surface having a first portion having a first diameter and a second portion having a second diameter, said first diameter being greater than said second diameter, and said first portion being disposed over said connecting balls in the unconnected position and said second portion being disposed over said locking balls in the connected position.

24. The fluidline connector according to claim 23, wherein the fluidline includes a circumferential groove in an outer periphery thereof, said connecting balls being engaged within said circumferential groove when said second sleeve is at the connected position.

25. The fluidline connector according to claim 20, wherein an inner surface of said first sleeve is engageable with said connecting balls, said inner surface having a first portion having a first diameter and a second portion having a second diameter, said first diameter being greater than said second diameter, and said first portion being disposed over said locking balls in the disengaged position of said first sleeve and said second portion being disposed over said locking balls in the engaged position.

26. The fluidline connector according to claim 25, wherein the fluidline includes a circumferential groove in an outer periphery thereof, said connecting balls being engaged within said circumferential groove when said first sleeve is at the engaged position.

27. The fluidline connector according to claim 2, further comprising a valve actuator member disposed within said central bore, said valve actuator member being engageable with said first valve at said second position of the body member to thereby open said first valve and permit flow through said central fluid passageway.

28. The fluidline connector according to claim 27, wherein the fluidline includes a second valve therein for controlling flow through the fluidline, the second valve being aligned with the central bore when the fluidline is connected to the piston member, and said valve actuator member being engageable with the second valve at said second position of the body member to thereby open the second valve.

29. The fluidline connector according to claim 17, wherein the fluidline includes a second valve therein for controlling flow through the fluidline, the second valve being aligned with first valve and disposed adjacent thereto when the fluidline is received in the piston member, said first valve being engageable with said second valve when the body member moves from the first position to the second position.

30. The fluidline connector according to claim 1, further including a cylindrical seal sleeve disposed around an end of the body member and surrounded by said connecting means, said seal sleeve being configured so as to at least partially receive an end of the fluidline therein.

31. The fluidline connector according to claim 30, further including at least one seal disposed within said seal sleeve, said seal being arranged for sealing engagement with the end of the body member and the end of the fluidline.

32. The fluidline connector according to claim 30, wherein one end of the seal sleeve includes a thread on an interior surface thereof and the end of the body member includes a thread on an exterior surface thereof, said threads being engageable with each other whereby said seal sleeve is removable from said body member.

* * * * *

UNITED STATES PATENT AND TRADEMARK OFFICE
CERTIFICATE OF CORRECTION

Page 1 of 1

PATENT NO. : 6,039,303
DATED : March 21, 2000
INVENTOR(S) : Danielson et al.

It is certified that error appears in the above-identified patent and that said Letters Patent is hereby corrected as shown below:

Title Page:
Item, [56] References Cited, U.S. Patent Documents: insert --4,060,219  11/1977 Crawford-- in appropriate order Signed and Sealed this Twenty-fourth Day of July, 2001

*Attest:*

*Attesting Officer*

NICHOLAS P. GODICI
*Acting Director of the United States Patent and Trademark Office*